(12) United States Patent
Inoue et al.

(10) Patent No.: US 8,113,669 B2
(45) Date of Patent: Feb. 14, 2012

(54) LEG LENGTH ADJUSTING MECHANISM FOR A PROJECTION TYPE IMAGE DISPLAY UNIT

(75) Inventors: Hiroyuki Inoue, Fujisawa (JP); Takeshi Katayama, Yokohama (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 262 days.

(21) Appl. No.: 12/619,969

(22) Filed: Nov. 17, 2009

(65) Prior Publication Data

US 2010/0123882 A1 May 20, 2010

(30) Foreign Application Priority Data

Nov. 17, 2008 (JP) ................................ 2008-292903

(51) Int. Cl.
*G03B 21/14* (2006.01)
(52) U.S. Cl. ........................................................ 353/119
(58) Field of Classification Search .............. 353/70–72, 353/74, 79, 119, 122; 348/787, 789, 836
See application file for complete search history.

(56) References Cited

U.S. PATENT DOCUMENTS 7,396,137 B2 * 7/2008 Lim ............................... 353/119

FOREIGN PATENT DOCUMENTS

| JP | 2006-106487 | 4/2006 |
|----|-------------|--------|
| JP | 2007-033874 | 2/2007 |
| JP | 2008-116577 | 5/2008 |

* cited by examiner

*Primary Examiner* — Georgia Y Epps
*Assistant Examiner* — Don Williams
(74) *Attorney, Agent, or Firm* — Kilpatrick Townsend & Stockton LLP

(57) ABSTRACT

A projection type image display unit has a housing on which a light source and an image display part for transmission or reflection of light from the light source are mounted. The unit includes a position adjusting device, by which a displayed position of an image is adjusted. The position adjusting device comprises: a manipulation member being vertically movable with a part thereof projecting from a side of the housing; a leg member projecting from a bottom of the housing and adapted to freely vary an amount of the projection thereof; and a connecting member connecting the manipulation member with the leg member to set the amount of the projection of the leg member by manipulating the manipulation member in a vertical direction. The connecting member comprises a lever member so that a movement direction of the manipulation member becomes the same as a movement direction of the housing and a movement amount of the manipulation member substantially becomes the same as a movement amount of the housing.

8 Claims, 6 Drawing Sheets

LEG LENGTH ADJUSTING MECHANISM FOR A PROJECTION TYPE IMAGE DISPLAY UNIT

CROSS-REFERENCE TO RELATED APPLICATION

This application claims priority from Japanese Patent Application JP 2008-292903, filed on Nov. 17, 2008, the content of which is hereby incorporated by reference into this application.

BACKGROUND OF THE INVENTION

The present invention relates to adjustment of a display position of an image in an electronic equipment for projecting an image onto a screen etc. and particularly, a projection type display unit provided with a position adjustment device which facilitates adjustment in a height direction and adjustment in movement of a housing.

In recent years, liquid crystal projectors as a projection type image display unit spread widely for uses as projectors in presentation and as projectors in home theaters. Under the present situation, liquid crystal projectors are made small in size and lightweight to be carried into places of presentation, rooms, in which home theaters are present, etc. to be put on desks in rooms.

On the other hand, a screen, onto which an image is projected, is generally installed in many cases higher than a position on a desk, on which a liquid crystal projector is placed, while depending upon an area of a place of presentation, a room, or the like.

Under such situation, liquid crystal projector is adjusted so that the front of its housing is lifted up in order that a displayed position of an image is projected onto a screen.

Arts for adjustment of a displayed position of an image in a projection type image display unit are disclosed in JP-A-2006-106487, JP-A-2007-33874, and JP-A-2008-116577.

For details, an adjuster device described in JP-A-2006-106487 includes a height adjusting shaft provided on an upper portion thereof with a worm and provided on a lower portion thereof with a knob, and an adjusting leg provided with a rack, which meshes with the worm, the knob being turned to adjust a amount, by which the height adjusting shaft projects. Since a amount of projection is adjusted by a worm and rack arrangement, it is possible to finely adjust the amount of projection.

Also, a projected position adjusting device of a projector described in JP-A-2007-33874 includes a movable leg provided to be able to advance and retreat with respect to a bottom plate of a projector housing, and a amount of advancement and retreat is given by an electrically driving unit fixed to the projector housing.

Also, a height adjusting device described in JP-A-2008-116577 includes a gear mechanism for adjusting a projection amount of an adjustment leg, and an adjustment knob, which is formed by a bevel gear, is provided on a leg guide, which guides the adjustment leg, whereby the adjustment knob can be manipulated in the same direction as a direction, in which adjustment of a projection height is desired.

SUMMARY OF THE INVENTION

Conventionally, a manner of lifting up the front of a housing of a liquid crystal projector to adjust a position, in which an image is displayed, is carried out by using a screw adjusting mechanism since fine adjustment in a height direction is easy to accomplish.

According to the art described in JP-A-2006-106487, it is not possible to intuitionally determine correspondence relation between a direction, in which the knob is turned, and a direction, in which a displayed position of an image moves, and so a direction, in which the knob is turned, is confirmed while an image as projected is seen. Also, while it is possible to finely adjust the amount of projection, a lot of time is needed in order to accomplish movements over a desired amount of movement.

According to the art described in JP-A-2007-33874, however, an improvement in manipulative response can be achieved but the provision of the electrically driving unit leads to large-sizing and an increase in cost on a side of equipment.

According to the art described in JP-A-2008-116577, however, mechanisms such as the bevel gear, etc. are made large in size. Further, while it is possible to finely adjust the amount of projection in the same manner as in JP-A-2006-106487, a lot of time is needed in order to accomplish movements over a desired amount of movement.

In order to solve the problems described above, the invention provides a projection type image display unit having a base body on which a light source and an image display part for transmission or reflection of light from the light source are mounted and a position adjusting device for adjusting a displayed position of an image. The position adjusting device comprises a manipulation member vertically movable with a part thereof projecting from a side of the housing of the projection type image display unit, a leg member which is projected from a bottom of the housing of the projection type image display unit and a projecting amount of which is freely variable, and a connecting member connecting the manipulation member with the leg member to set the amount of projection of the leg member by means of movement of the manipulation member in a vertical direction. The connecting member comprises a lever member so that when a displayed position of an image of the projection type image display unit is adjusted, a movement direction of the manipulation member becomes the same as a movement direction of the housing and a movement amount of the manipulation member substantially becomes the same as a movement amount of the housing.

According to the invention, it is possible to provide a simple and inexpensive projection type image display unit having a position adjusting device, in which a movement direction of the manipulation member becomes the same as a movement direction of the unit, a movement amount of the manipulation member substantially becomes the same as a movement amount of the unit, a period of time required for manipulation of adjustment can be shortened and the manipulation of adjustment is easy.

Other objects, features and advantages of the invention will become apparent from the following description of the embodiments of the invention taken in conjunction with the accompanying drawings.

DESCRIPTION OF THE PREFERRED EMBODIMENTS

An embodiment of the invention will be described hereinafter in detail with reference to the drawings.

Figure 1:
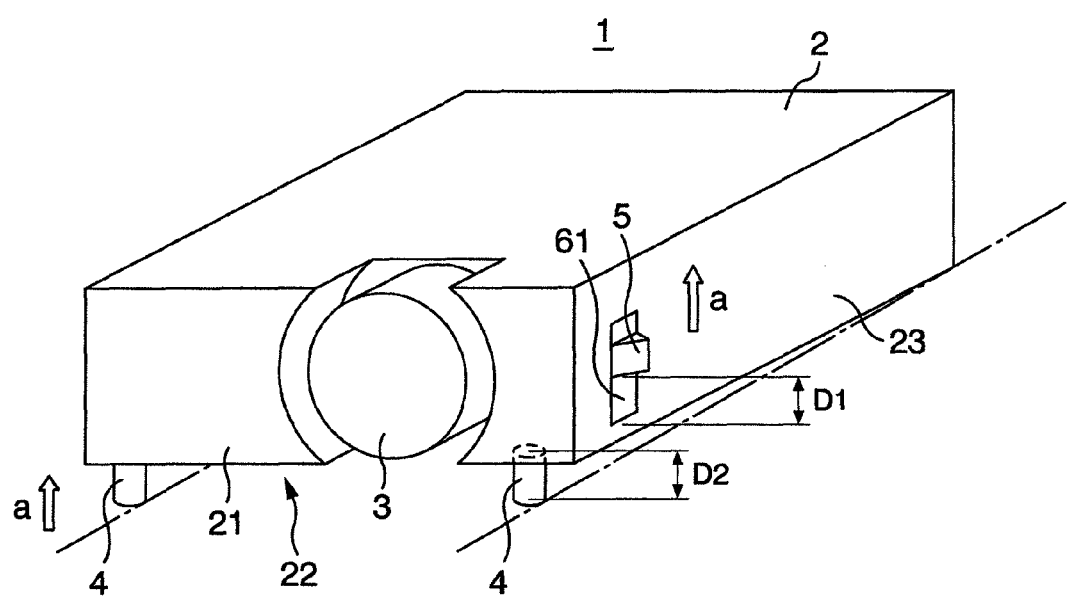
FIG. 1 is a perspective view showing an, outward appearance of an embodiment of a projection type image display unit according to the invention.

FIG. 1 is a perspective view showing an outward appearance of an embodiment of a projection type image display unit according to the invention.

As shown in FIG. 1, a projection type image display unit 1 includes a projection lens 3 arranged on a front side 21 of a housing 2 to project an image. A displayed position of the image is determined according to a direction of projection. Leg members 4 are provided at both ends of a bottom surface 22 of the housing 2 on the front side and the leg members are adapted to advance and retreat in a predetermined amount of projection from the housing 2. Depending upon an amount, by which the leg members 4 project from the housing 2, the housing 2 is varied in height position to set a projection position of the projection lens 3 in a height direction. Further, a vertically movable manipulation member 5 is arranged on a side 23 of the housing 2 with a part thereof projecting from a slot 61 of the housing 2. The manipulation member 5 is operatively moved in an arrow direction (a), or a counter direction to the direction (a) to move one of the leg members 4 vertically to move the housing 2 in the arrow direction (a), or the counter direction to the direction (a) to adjust a projected height position of an image. While not shown, another manipulation member 5 is likewise provided on an opposite side of the housing 2 to the side 23. In the case where a location, in which the projection type image display unit is set, is not on a horizontal plane, the left and right manipulation members 5 independently adjust the projection amounts of the leg members 4, to accomplish positioning so that a displayed position of an image is made horizontal.

While details of a manner, in which the manipulation members 5 are manipulated to move the leg members 4 to adjust the housing 2 in height, will be described in due order, the following explanation will be given typifying one of position adjusting devices provided on left and right sides since the devices are the same in construction and operation as each other.

The embodiment of the invention has a feature in a configuration, in which when the manipulation member 5 is manipulated in, for example, the arrow (a) direction, the housing 2 is moved in the arrow (a) direction and a manipulated amount (D1) of the manipulation member 5 in the arrow (a) direction substantially becomes equal to an amount of movement (D2) of the housing 2 (D1≈D2) in the arrow (a) direction. This feature has an advantage that height adjustment accomplished by an operator corresponds to an operator's sensual image and manipulation becomes easy. However, it is preferred that a manipulated amount (D1) of the manipulation member 5 be made substantially equal to a movement amount (D2) of the housing 2, but this is not limitative.

Figure 2:
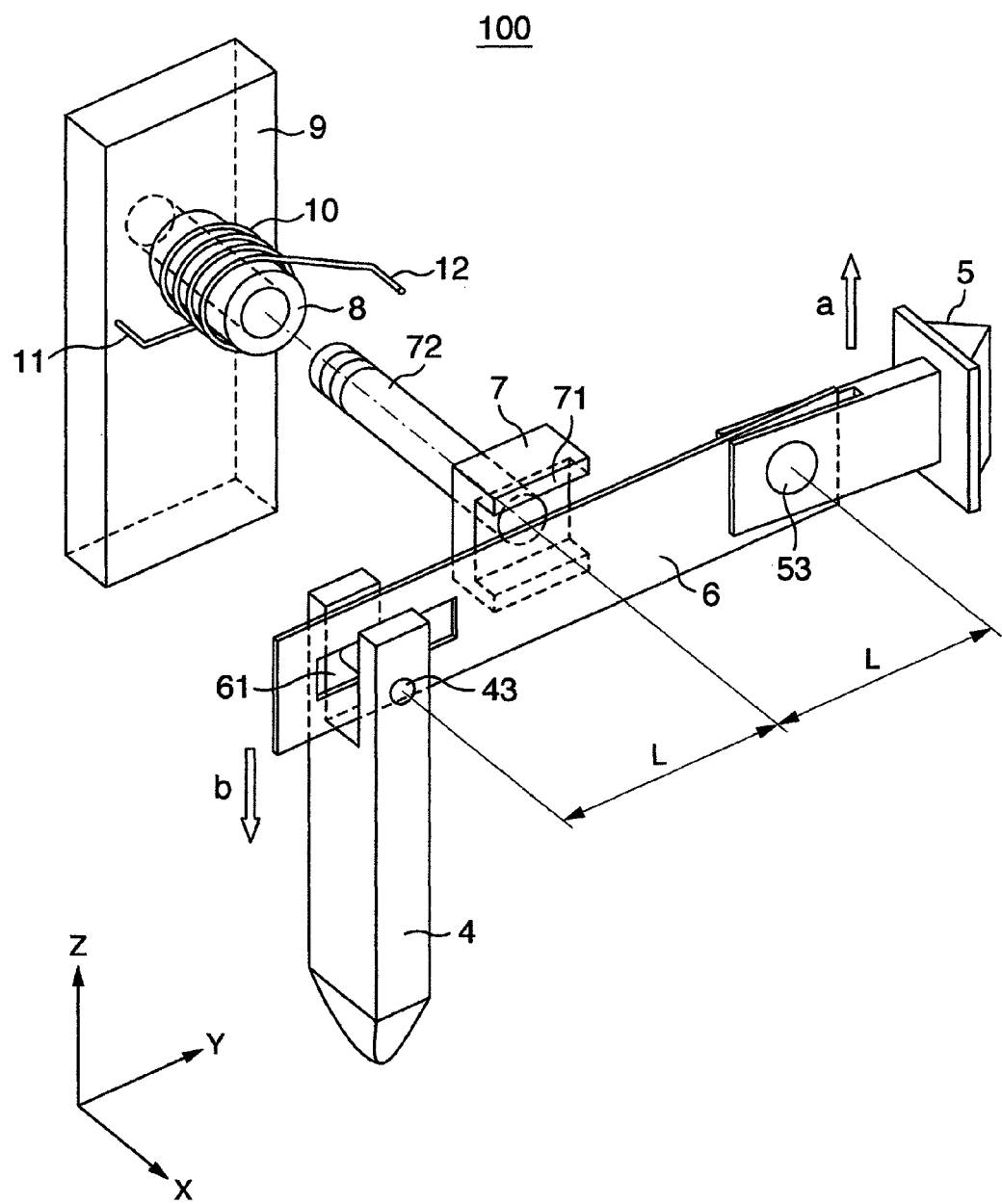
FIG. 2 is a perspective view showing outline construction of a position adjusting device of the embodiment of the invention with a part thereof disassembled.

FIG. 2 is a perspective view showing an outline construction of the position adjusting device of the invention with a part thereof disassembled.

First, construction of the position adjusting device 100 will be described with reference to FIG. 2. As shown in FIG. 2, the position adjusting device 100 comprises the leg member 4, the manipulation member 5, a connecting member 6 to connect the leg member 4 with the manipulation member 5, a holding member 7 that holds the connecting member 6, and a fixation member 9 integrally formed with a bearing member 8, which journals an operating shaft 72 of the holding member 7.

The holding member 7 has flange portions 71, which are provided to oppose to each other in a vertical direction of the holding member 7 to interpose the connecting member 6 in a width direction of the connecting member 6, and holds the connecting member 6 so that the connecting member 6 turns together with the holding member 7.

The leg member 4 and the manipulation member 5 are respectively pivotally connected to both ends of connecting member 6 by means of pivot shafts 43, 53. In addition, the pivot shaft 43 of the leg member 4 engages with a slot 61, which is opened through the connecting member 6.

On the other hand, the holding member 7, described above, for interposing the connecting member 6 includes an operating shaft 72 serving as a fulcrum of turning for the connecting member 6. The operating shaft 72 is rotatably held by the bearing member 8 of the fixation member 9. Also, the operating shaft 72 extends through the fixation member 9 and is held by a torque hinge mechanism (not shown in FIG. 2) described later.

The position adjusting device 100 constructed in the manner described above is fixed through the fixation member 9 to a base body in the housing 2 of the projection type image display unit 1 and is arranged with the manipulation member 5 projecting from the slot 61 on the side 23 of the housing 2 shown in FIG. 1 and with a part of the leg member 4 projecting from the opening on the bottom surface 22 of the housing 2. The base body is integrally formed with the housing 2.

Subsequently, a state, in which the projection type image display unit 1 is adjusted in height by manipulation of the manipulation member 5, will be described with reference to FIGS. 2 and 3.

Figure 3A:
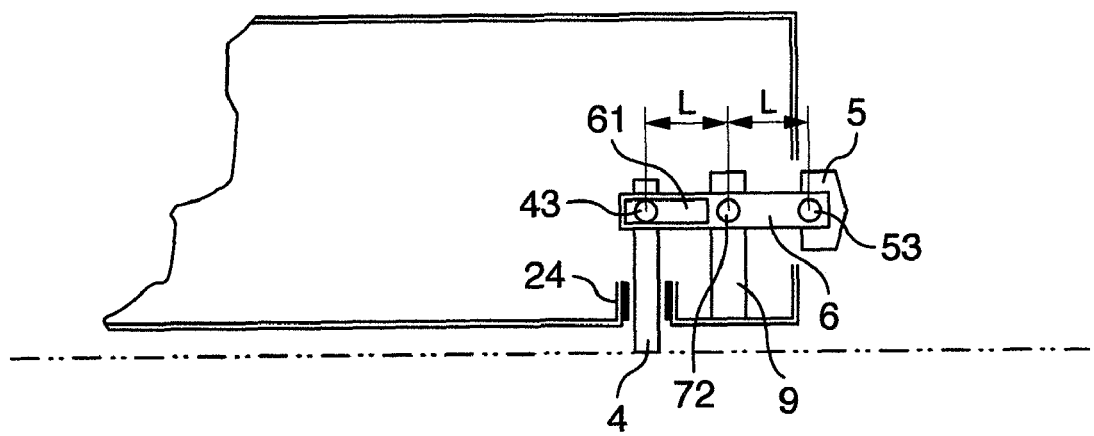
FIGS. 3A and 3B are views conceptually illustrating the operation of the position adjusting device of the embodiment of the invention.
Figure 3B:
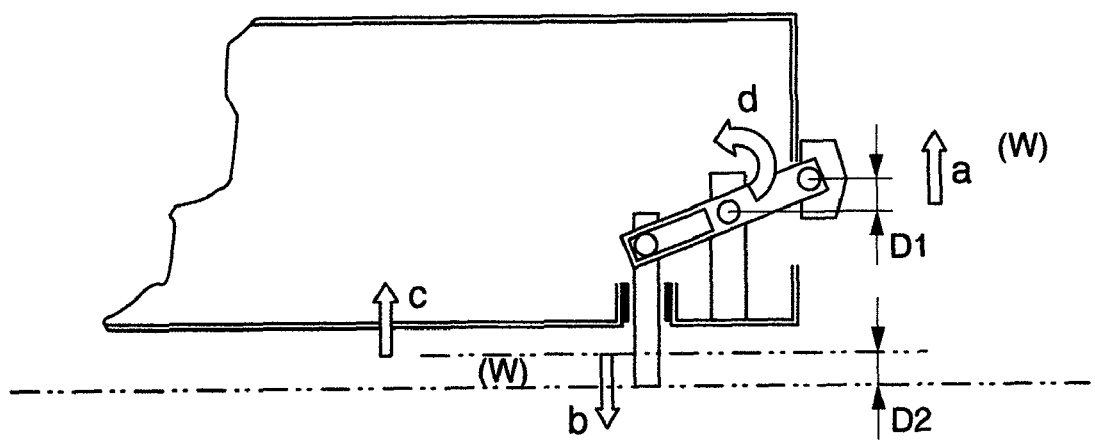

FIGS. 3A and 3B are views conceptually illustrating the operation of the position adjusting device according to the embodiment of the invention. FIG. 3A shows a state in which an amount, by which the leg member 4 projects from the housing 2, is small before a position of an image is adjusted, and FIG. 3B shows a state in which the amount, by which the leg member 4 projects from the housing 2, is increased after the position of the image is adjusted.

When the manipulation member 5 is slidingly moved by an amount of movement (D1) from the state shown in FIG. 3A to the state shown in FIG. 3B in the arrow (a) direction, the connecting member 6 connected by the pivot shaft 53 is turned in an arrow (d) direction with the operating shaft 72 as a fulcrum, so that the leg member 4 having the pivot shaft 43 engaging with the slot 61 at an opposite end of the connecting member 6 with respect to the operating shaft 72 is moved an amount of movement (D2) in an arrow (b) direction. At this time, a guide member 24, which guides and holds the leg member 4, is preferably provided on the housing 2 for the sake of smooth movement of the leg member 4.

Movement of the leg member 4 with the amount of movement (D2) in the arrow (b) direction results in movement of the housing 2 from a desk with the amount of movement (D2) in an arrow (c) direction.

That is, when an amount of movement (D1) of the manipulation member 5 is made substantially equal to an amount of movement (D2) of the leg member 4, a direction of movement and an amount of movement upon the moving manipulation of the manipulation member 5 brings about a situation, in which an amount of movement of and an amount of movement of the housing 2 are easy to recognize in terms of an image, so that a projected position of an image in the projection type image display unit 1 is readily adjusted.

Specifically, it suffices that in the connecting member 6, a position (L) of the manipulation member 5 from the operating shaft 72 and a position (L) of the leg member 4 from the operating shaft 72 are made substantially equal to each other. Also, movement of the housing 2 in a direction opposite to the arrow (c) direction is likewise accomplished by manipulation of the manipulation member 5 in a direction opposite to the arrow (a) direction.

Here, an explanation will be given to forces of manipulation of and minute adjustment of the manipulation member 5 and an operation for positioning the housing 2.

In the construction shown in FIG. 3, the weight W of the projection type image display unit 1 is born by the leg members 4. Accordingly, in order to move the housing 2 in the arrow (c) direction against the weight born by the leg members 4, a manipulating force on the manipulation member 5 is required to be substantially equal to the weight W, assuming that the manipulation member 5 and the leg member 4 engage with the connecting member 6 in substantially the same positions (L) relative to the operating shaft 72. For example, assuming that the weight of the projection type image display unit 1 is about 2 kgf and engaging positions (L) of the respective members relative to the operating shaft 72 are about 15 mm, a manipulating force of the manipulation member 5 required for manipulation of one of the leg members 4 amounts to about 1.5 kgf and can be said to be a fairly manipulatable force.

However, the above-mentioned manipulating force is a manipulating force when the housing 2 is elevated, and when the housing 2 is lowered from a set position, the housing 2 naturally descends owing to the weight of the projection type image display unit 1. That is, since the manipulating force for adjustment of the housing 2 in height differs between upward and downward directions, the manner described above is not preferable as a manner of manipulation.

Figure 4:
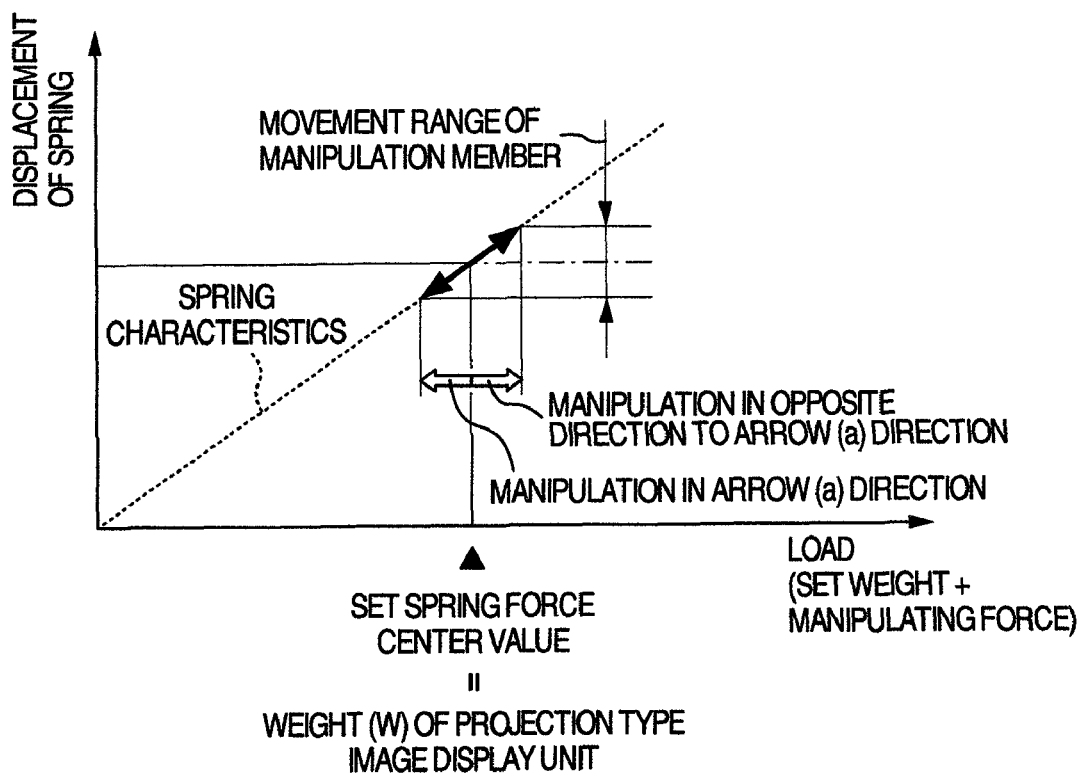
FIG. 4 is a graph showing characteristics of a torsion coil spring and a manipulating force of a manipulation member in the embodiment of the invention.

Therefore, it is necessary to set a manipulating force on the manipulation member 5 so as to give a feeling that it is substantially the same in upward and downward directions. The position adjusting device 100 according to the embodiment of the invention comprises a torsion coil spring 10 as shown in FIG. 2 in order to bear the weight W of the projection type image display unit 1. The torsion coil spring 10 is mounted about the bearing member 8 for the operating shaft 72, and the torsion coil spring 10 has an arm 11 at an end thereof latched on the fixation member and an arm 12 at the other end thereof latched on the flange portion 71 on a side opposite to the leg member 4 with respect to the operating shaft 72. The torsion coil spring 10 is set to provide for a force corresponding to the weight W of the housing 2 as shown in FIG. 4. That is, the weight W of the housing 2 is born by the force of the torsion coil spring 10 and so a load on the manipulation member 5 is relieved.

FIG. 4 is a view illustrating characteristics of the torsion coil spring and a manipulating force of the manipulation member in the embodiment of the invention.

Here, a set load on a length, over which the torsion coil spring 10 is mounted, corresponds to a load, by which the housing 2 is born. When the set load of the torsion coil spring 10 is small, the housing 2 cannot be born by the leg member 4, and on the contrary, when the set load of the torsion coil spring 10 is large, the housing 2 is positioned at a position where an amount, by which the leg member 4 projects from the housing 2, is maximum. Consequently, the manipulating force of the manipulation member 5 differs according to a direction of the manipulation. In order to solve this disadvantage, it is preferable that a set spring force of the torsion coil spring 10 is equal to the weight (W) of the projection type image display unit 1 as shown in FIG. 4.

In order to vary an amount of projection of the leg member 4 to adjust a height position of the housing 2, the manipulation member 5 is moved in the arrow (a) direction, or in an opposite direction to the arrow (a) direction to turn the connecting member 6 whereby the flange portion 71 is rotated to lead to displacement of the torsion coil spring 10, by which displacement a spring load is increased or decreased. That is, an increase or a decrease in the load of the torsion coil spring 10 is felt as variation in the manipulating force at the time of manipulating the manipulation member 5. Therefore, it is preferable that a spring characteristic curve shown in FIG. 4 is as small in gradient as possible in order not to have variation in the manipulating force of the manipulation member 5 felt as far as possible.

Figure 5:
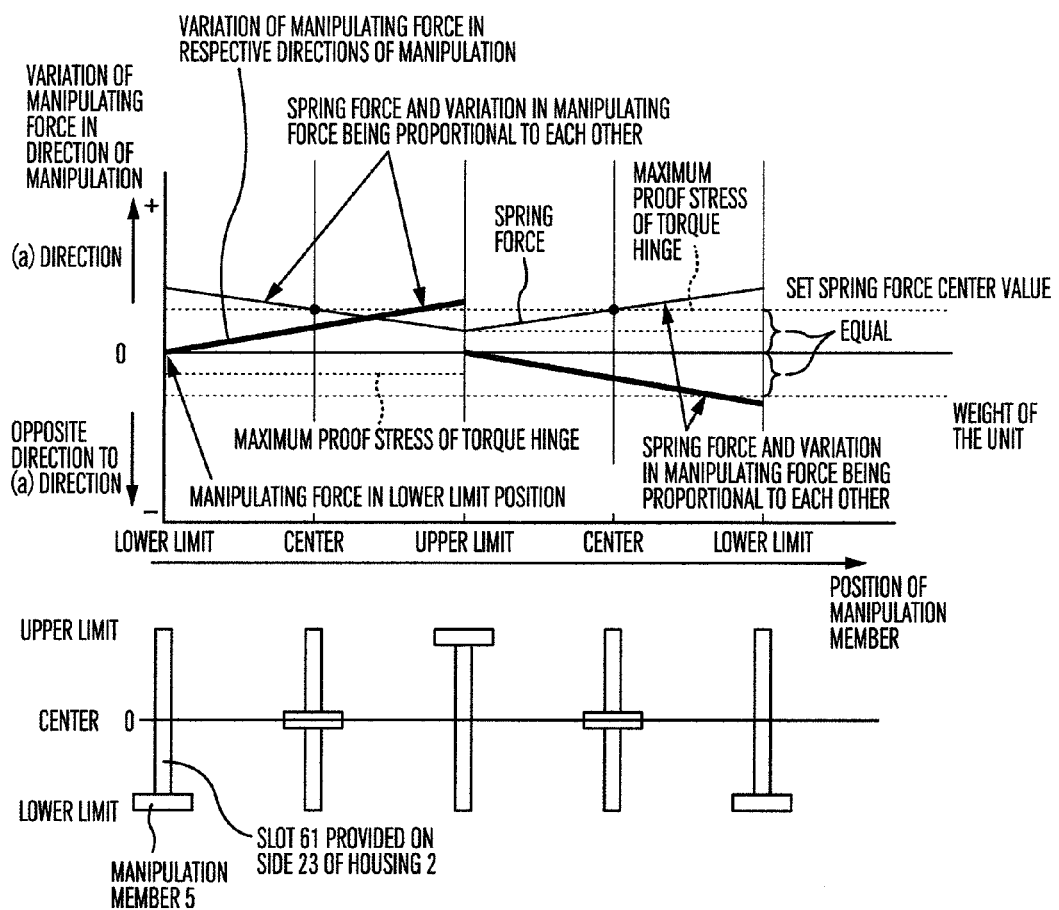
FIG. 5 is a conceptual view illustrating a manipulation position and a manipulating force of the manipulation member in the embodiment of the invention.

FIG. 5 is a conceptual view illustrating a manipulation position and a manipulating force of the manipulation member in the embodiment of the invention. In FIG. 5, it is shown that an operative range of the manipulation member 5 is determined by the slot 61 provided on the side 23 of the housing 2. FIG. 5 shows the relationship between a direction of manipulation and a manipulating force when the manipulation member 5 is moved from a lower limit position of the range to an upper limit position of the range and then from the upper limit position to the lower limit position. The drawing shows a state, in which a spring force balances the weight of the unit when the manipulation member 5 is at a central position. At this time, the manipulating force is put in a state of (manipulating force+spring force)≧weight of the unit. Bearing in any position cannot be accomplished until (a force obtained by a frictional force of a torque hinge≦spring force+manipulating force−weight of the unit) is materialized in order to accomplish bearing in all positions. At this time, when the manipulation member 5 is moved from the lower limit position to the upper limit position in the arrow (a) direction, variation in the manipulating force decreases a load of the spring gradually. At this time, a frictional force obtained by the torque hinge is constantly added to the manipulating force. On the contrary, when the manipulation member 5 is moved from the upper limit position to the lower limit position in an opposite direction to the arrow (a) direction, a spring force increases gradually. A frictional force is also constantly added to the spring force. As shown in FIG. 5, it is found that variation in the manipulating force depends upon the spring force. Thereby, it is possible to produce an effect that the smaller the gradient of the spring characteristic curve shown in FIG. 4, the harder variation in the manipulating force to sense.

Here, it is required that the housing 2 be held in a set position after it is adjusted in height by moving the manipulation member 5. Subsequently, an explanation will be given to a manner of maintaining the set position. According to the embodiment of the invention, the torque hinge mechanism is provided in maintaining a height position of the housing 2.

Figure 6:
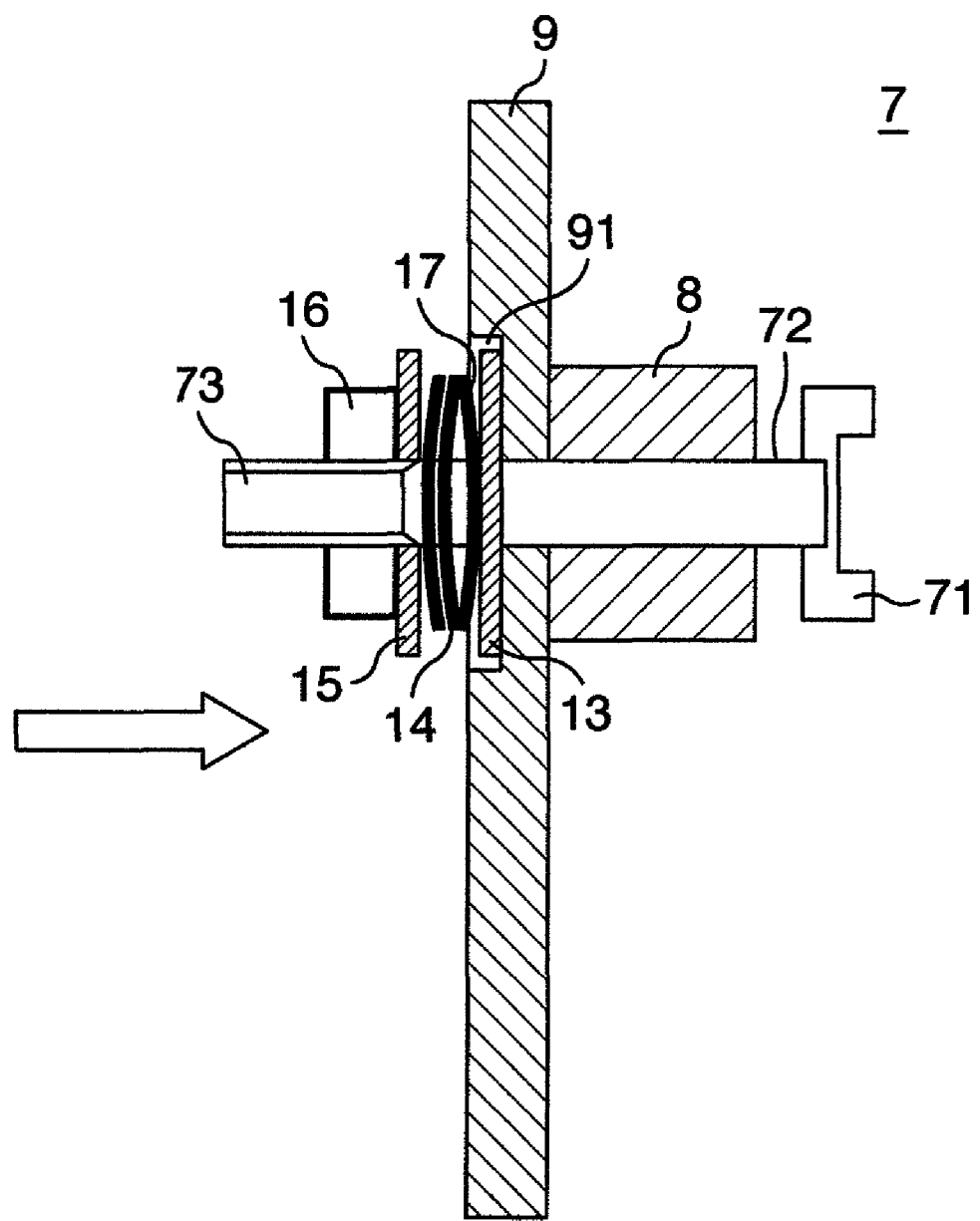
FIG. 6 is a conceptual view illustrating a torque hinge mechanism in the embodiment of the invention.

FIG. 6 is a conceptual, cross sectional view illustrating the torque hinge mechanism according to the embodiment of the invention. In FIG. 6, fundamental portions of the holding member 7, the bearing member 8, and the fixation member 9 are the same as described above. Here, threads are formed in predetermined regions of a shaft portion 73 on an opposite side of the holding member 7 to the flange portion 71. As shown in FIG. 6, after being inserted into the bearing member 8, the holding member 7 forms a torque hinge portion, which makes use of a frictional force in a thrust direction, on an opposite side of the fixation member 9 with respect to the flange portion 71.

That is, the torque hinge mechanism is constructed such that the operating shaft 72 of the holding member 7 is inserted through flat washers 13, 15 and a group of a plurality of bevel-shaped washers 14, which are pushed against the fixation member 9 by a nut 16 from behind in a direction of a blank arrow. Also, the plurality of bevel-shaped washers 14 are provided and a viscous material 17 such as molybdenum grease is held in clearances of the bevel-shaped washers 14 arranged in a recess 91 of the fixation member 9. Here, the recess 91 is arranged on the fixation member 9 to hold the viscous material 17 since the viscous material 17 discharged from between the washers 14 in secular use is intercepted by a bank portion of the recess of the fixation member 9 to be prevented from scattering.

Frictional force generated on the bevel-shaped washers 14 and the viscous material 17 by a push force of the torque hinge mechanism in the thrust direction maintains the connecting member 6 in a set position in movement to have the leg member 4 positioning the housing 2.

However, positioning determined by the torque hinge mechanism can be maintained in a situation, in which any external force is not applied, without hindrance, but the housing shifts from a location of positioning when an external force is applied directly to the housing or the like. In order to inhibit such unexpected, external force from positionally shifting the housing 2 as far as possible, it suffices to set a frictional force in the torque hinge mechanism to a large magnitude, which leads to an increase in a manipulating force on the manipulation member 5 to impede easiness in height adjustment. Therefore, it is preferable that a frictional force in the torque hinge mechanism is approximate to a torsion coil spring force, which is given to hold the housing 2, as far as possible, and is locked after positioning is determined by the manipulation member 5.

Since the housing 2 in the embodiment of the invention can be adjusted steplessly in height, the lock mechanism preferably involves a stepless, frictional force.

As described above, according to the invention, it is possible to provide a simple and inexpensive projection type image display unit having a position adjusting device, in which a movement direction of the manipulation member becomes the same as a movement direction of the unit, a movement amount of the manipulation member substantially becomes the same as a movement amount of the unit, a period of time required for manipulation of adjustment can be shortened and the manipulation of adjustment is easy.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A projection type image display unit having a housing on which a light source and an image display part for transmission or reflection of light from the light source are mounted, the projection type image display unit including a position adjusting device, by which a displayed position of an image is adjusted, the position adjusting device comprising:
a manipulation member being vertically movable with a part thereof projecting from a side of the housing;
a leg member projecting from a bottom of the housing and adapted to freely vary an amount of the projection thereof; and
a connecting member connecting the manipulation member with the leg member to set the amount of the projection of the leg member by manipulating the manipulation member in a vertical direction, and
wherein said connecting member comprises a lever member so that a movement direction of the manipulation member becomes the same as a movement direction of the housing and a movement amount of the manipulation member substantially becomes the same as a movement amount of the housing.

2. The projection type image display unit according to claim 1, further comprising an elastic bias member, which holds the projection type image display unit in a predetermined position, and
wherein a manipulating force on the manipulation member is made substantially the same irrespective of a direction, in which the housing is moved.

3. The projection type image display unit according to claim 2, wherein the manipulation member and the leg member are pivotally connected to the connecting member at substantially both ends of the connecting member with an operating shaft of the connecting member therebetween and wherein said position adjusting device includes a torque hinge mechanism which gives a frictional force in a thrust direction of the operating shaft, the torque hinge mechanism is adapted to enable stepless manipulation of the manipulation member in a vertical direction and to hold the leg member in a set position.

4. The projection type image display unit according to claim 3, wherein the torque hinge mechanism is constructed such that a plurality of bevel-shaped washers are laminated and mounted on the operating shaft to be pushed against a fixation member, which holds the operating shaft.

5. The projection type image display unit according to claim 4, wherein a part of the fixation member, which holds the torque hinge mechanism, is substantially concave-shaped, the bevel-shaped washers are arranged in opposition to a substantially concave, inner surface of the fixation member with a viscous material therebetween, and the viscous material is inhibited by the concave, peripheral bank portion from scattering.

6. A leg adjusting mechanism of a projection type image display unit comprising:
a leg member projecting a predetermined amount from a bottom of the projection type image display unit so that the projection type image display unit inclines in order to adjust a direction, in which a projected image is projected;
a manipulation member adapted to move in the same direction as that, in which the leg member projects, to set a projection amount of the leg member;
a connecting member connecting the leg member and the manipulation member so that the projection of the leg member is made substantially the same as a movement amount of the manipulation member; and
a torque hinge mechanism to lock the connecting member so as to maintain the projection amount of the leg member.

7. The leg adjusting mechanism of a projection type image display unit according to claim 6, wherein the connecting member engages the manipulation member and the leg member with each other at substantially both ends of the connecting member with an operating shaft of the connecting member therebetween, and the torque hinge mechanism is adapted to give a frictional force in a thrust direction of the operating shaft.

8. The leg adjusting mechanism of a projection type image display unit according to claim 7, wherein the frictional force of the torque hinge mechanism is equal to or greater than the weight of the projection type image display unit.

* * * * *